Dec. 15, 1953   V. SIMONSEN ET AL   2,662,416
V BELT PULLEY
Filed April 3, 1951

INVENTORS:
VILHELM SIMONSEN AND
BY PETER NIELSEN

UNITED STATES PATENT OFFICE 2,662,416

V BELT PULLEY

Vilhelm Simonsen and Peter Nielsen,
Randers, Denmark

Application April 3, 1951, Serial No. 218,928

Claims priority, application Denmark
April 29, 1950

1 Claim. (Cl. 74—230.17)

Adjustable V-belt pulleys are known, where a bushing with stepped and threaded outer circumference is movably arranged around a long hub of a fixed part of the pulley. The thread of one step has a pitch twice as large as the thread of the preceding step. When the bushing is rotated, the parts of the pulley screwed on the bushing are screwed closer to or further away from each other.

These pulleys have the disadvantage that the space between the two parts of the pulley, on which the belt is running cannot be adjusted when one belt is worn more rapidly than the other, unless the space between all the other parts of pulley is altered at the same time, so that it will be necessary to discard the worn belt long before it is quite useless.

Furthermore, a V-belt pulley is known, in which the long hub of a fixed part of pulley is threaded on the outside, so that another part of pulley can be screwed on the hub and be held securely in fixed positions on the hub by means of a lock nut or pointed screw. This known construction is suitable only for use where only a single belt is to be used on the same pulley.

The purpose of the present invention is to make a V-belt pulley which provides room for several belts of different thicknesses running parallel to each other.

The outstanding feature of the device is that the parts of pulley screwed on the hub between the parts of the outer pulley have surfaces facing each other, the parts of the pulley being capable of being tightened against each other at any place along the hub, so that the wedge-shaped grooves formed between these and the neighboring pulleys have a width adapted to the V-belt.

The results achieved hereby are that the size of the wedge-shaped groove can be adapted as required, so that when one of the belts running parallel is worn more than the others, it can still be used with the other belts by alteration of the size of the pulley groove.

Figure 1:
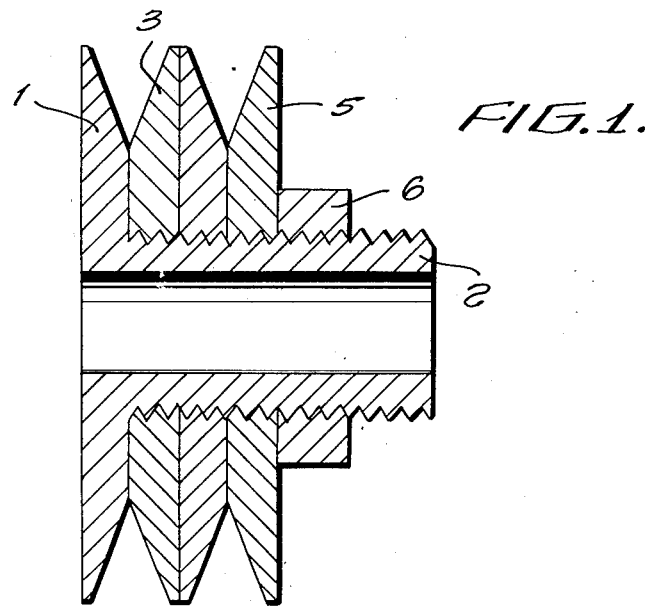
Figure 2:
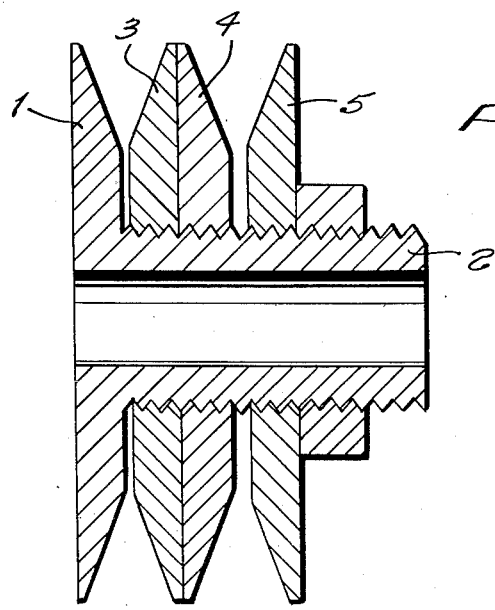

In the accompanying drawing:

Figs. 1 and 2 show longitudinal sections in a V-belt pulley device according to the invention in two different positions for use.

Element 1 is a disc-shaped part of a pulley, having a long hub 2, which is threaded on the outside. On the hub are screwed a number of disc-shaped parts 3, 4 and 5 of the pulley device, which in pairs form faces for a V-belt.

Fig. 1 shows the pulleys screwed close together with a nut 6 screwed against the pulley part 5, whereas in Fig. 2 they are shown adjusted with a small space between the parts 1 and 3 and a larger space between the parts 4 and 5. The parts 3 and 4 should always be screwed tightly against each other, so that they form a lock nut for each other.

By the V-belt pulley described above a pulley for several belt parts can be made in a simple and easy manner, and the pulleys can easily be adjusted to different sizes of belts.

We claim:

A multiple adjustable V-belt pulley, comprising, in combination, a tubular hub having a portion screw-threaded on its outer face; a first disc-shaped member secured to said hub at one end thereof, said first disc-shaped member extending in transversal direction to said hub and having two side faces, said side face facing said screw-threaded hub portion including a conical side face portion extending inwardly from the rim of said first disc-shaped member; a second disc-shaped member having a central screw-threaded opening by which it is screw-threadedly mounted on said screw-threaded hub portion at a distance from and parallel to said first disc-shaped member, said second disc-shaped member having two side faces, said side face of said second disc-shaped member facing said first disc-shaped member including a conical side face portion extending inwardly from the rim of said second disc-shaped member, said conical side face portions of said first and second disc-shaped members forming a pulley groove for a V-shaped belt the width of which is adjustable by threading of said second disc-shaped member on said screw-threaded hub portion; a third disc-shaped member having a central screw-threaded opening by which it is screw-threadedly mounted on said screw-threaded hub portion and having two side faces, one side face of said third disc-shaped member abutting against the other side face of said second disc-shaped member pressing against the same and the other side face of said third disc-shaped member including a conical side face portion extending inwardly from the rim of said third disc-shaped member; a fourth disc-shaped member having a central screw-threaded opening by which it is screw-threadedly mounted on said screw-threaded hub portion at a distance from and parallel to said third disc-shaped member and having two side faces, the side face of said fourth disc-shaped member facing said third disc-shaped member including a conical side face portion extending inwardly from the rim of said fourth disc-shaped member, said conical side face portions of said third and fourth disc-shaped members forming a pulley groove for a V-shaped belt, the width of which is adjustable by threading of said fourth disc-shaped member on said screw-threaded hub portion; and nut means having a central screw-threaded opening by which it is screw-threadedly mounted on the screw-threaded hub portion and having one side face abutting against the other side face of said fourth disc-shaped member pressing against the same so as to hold it in adjusted position.

VILHELM SIMONSEN.
PETER NIELSEN.

References Cited in the file of this patent

UNITED STATES PATENTS

| Number | Name | Date |
| --- | --- | --- |
| 1,740,087 | Hall | Dec. 17, 1929 |
| 2,140,182 | Bowen | Dec. 13, 1938 |
| 2,254,380 | Mitchell | Sept. 2, 1941 |
| 2,523,397 | Siekmann | Sept. 26, 1950 |